United States Patent
Yu

(10) Patent No.: US 7,455,871 B2
(45) Date of Patent: Nov. 25, 2008

(54) STARCH-FREE FLOUR FOR NOODLES, BREAD AND THE LIKE

(76) Inventor: Eukki Qi Yu, 15342-B E. Valley Blvd., City of Industry, CA (US) 91745

( * ) Notice: Subject to any disclaimer, the term of this patent is extended or adjusted under 35 U.S.C. 154(b) by 489 days.

(21) Appl. No.: 11/187,184

(22) Filed: Jul. 21, 2005

(65) Prior Publication Data

US 2007/0020376 A1    Jan. 25, 2007

(51) Int. Cl.
*A23L 1/10* (2006.01)

(52) U.S. Cl. .................. 426/618; 426/447; 426/449; 426/518; 426/621; 426/622; 426/655; 426/656

(58) Field of Classification Search ............... 426/618, 426/621, 622, 655, 656, 447, 449, 518
See application file for complete search history.

(56) References Cited

U.S. PATENT DOCUMENTS 3,348,951 A * 10/1967 Evans ........................ 426/21
2004/0033291 A1 * 2/2004 Burgermeister et al. ....... 426/62

* cited by examiner

*Primary Examiner*—Helen F Pratt
(74) *Attorney, Agent, or Firm*—Raymond Y. Chan; David and Raymond Patent Firm

(57) ABSTRACT

A method of manufacturing starch-free flour includes the steps of grinding a starch-free rice bran to form a bran powder; finely grinding the bran powder under a predetermined circumstance to form nano bran fine particles carrying positive charges and having water and oil absorbing ability; and mixing the nano bran fine particles with protein powders and gluten powders to form the starch-free flour.

10 Claims, 1 Drawing Sheet

STARCH-FREE FLOUR FOR NOODLES, BREAD AND THE LIKE

BACKGROUND OF THE PRESENT INVENTION

1. Field of Invention

The present invention relates to flour-based foods, and more particularly to a starch-free flour and a manufacturing method thereof, wherein the starch-free flour, which contains nano bran fine particles, is adapted to replace the traditional flour to produce a starch-free nutritional and healthy food such as noodles, breads and the like.

2. Description of Related Arts

It is witnessed that people all over the world, especially in developed countries, have been giving so much concerns about health care and medical issues in decades. Actually, we live in a health conscious society and longevity is a common goal in all nations. However, a severe threat to the health of the global community is obesity as well as overweight. This is due to the fact that overweight and obesity could cause as much preventable diseases and death as any factors like cigarette smoking and excessive drinking. Here, overweight are no more personal matters, but a health issue that communities should address its serious consequences. According to the Surgeon General's office, the increases in overweight and obesity cut across all ages, racial and ethnic groups, and both genders, and overweight and obesity are associated with heart disease, certain types of cancer, type 2 diabetes, stroke, arthritis, breathing problems, and psychological disorders such as depression. In short, overweight could shorten people's lives.

The cause of overweight and obesity is no longer in doubt. In some respects, the cause sounds simple. People put on weight if the amount of energy that he took into his body from food is greater than the amount of energy that he used. Energy from food that he did not use would be converted into fat, and stored in the body. Meanwhile, the specific types of food that's eaten are key factors contributed to excessive energy. Several authorized medical journals had convincingly indicated that food high in sugar, fat, white flour, white rice, and salt, get people fat. In other words, weight gain occurs when the caloric intake is higher than the calories burnt each day in normal activities and exercise. When people consumed too much sugar and starch food, excessive energy would be stored as fat deposits, thereby causing energy unbalance as well as obesity.

On the other hand, human beings require food to grow, reproduce, and maintain good health. Without food, our bodies could not stay warm, build or repair tissue, or maintain a heartbeat. Eating the right foods can help us avoid certain diseases or recover faster when illness occurs. These and other important functions are fueled by chemical substances in our food called nutrients. Nutrients are classified as carbohydrates, proteins, fats, vitamins, minerals, and water.

Once food digested, carbohydrates, proteins, and fats provide the body with the energy it needs to maintain its many functions. As a result, people need a well balance food intake to maintain body's metabolism and daily consumption. However, American style processed food and fast food is malnutrition, i.e. real food is replaced by food lacking in essential nutrients. People eat more useless, fattening, destructive food, especially with too much starch contained instead of the fruits, vegetables, beans and nuts it really needs. The result is obesity, and all the illnesses that are obesity causes.

However, people living on this planet have relied on starch foods, like flour and rice as food supply for thousands of years. For instance, the annual world wide rice production output is around 390 million metric tons and wheat is around 570 million metric tons. Therefore, it is rather harder to change the eating habits inherited from our ancestors. Here, it's safe to point out that common grain food, rice and flour, are not very healthy. There are several reasons why rice and flour are bad: rice and wheat are in fact a large supply of starch, surrounded by a kernel. Starch decomposes (digests) into maltose and isomaltose in the intestines, which then decompose into glucose. In other words, when a person takes a slice of bread and crushes it in his hand, he is virtually eating that amount of refined sugar. The problem is that that amount of sugar elevates the blood sugar levels amazingly fast and causes pancreas to produce lots and lots of insulin to metabolize it. Humans are not adapted to eat such amounts of concentrated carbohydrates and the pancreas isn't fit to that job. Over time one will develop insulin resistance, hypoglycemia, diabetes II. Another problem is that the immune system crashes when blood sugar levels increases to high levels. Another problem with rice and flour is voidance of minerals and vitamins, which are needed to properly digest and metabolize the huge amount of starch. So, each time one eats a slice of bread or a spoon of rice, his body needs to take minerals and vitamins from its limited stores to digest and metabolize it. Over time, he will develop deficiencies of those vitamins and minerals.

Moreover, rice and wheat are in fact very hard to digest properly. It has two digestion phases. First, the starches, which are very long chains of carbohydrate molecules, must be separated into small pieces consisting of 2 glucose molecules. Next, the intestines need to produce enough enzymes (maltase) to digest the maltose into the elemental glucose molecules. This is quite a lot of work. The problem is that the human body isn't fit for this job and a part of the starch isn't absorbed and descends into the large intestines, feeding critters, causing inflammation, gasses, damage to the wall of the intestines, and other problems.

As for the problem of not getting enough starch (sugar), no such problem exists. Carbohydrates are optional. People can survive and feel perfectly healthy on a zero-carbohydrate diet. Several reports and researches have convincingly illustrated that people who virtually eat zero carbohydrates or low-carbohydrate diet are much healthier than people eating starch dominating meals each day.

As a result, weight reduction and maintenance of a desirable weight are concerns of many people in contemporary society. There is an increasing interest in low calorie food products. Many such foods have been formulated to provide calorie reduction by substituting artificial sweeteners for sugars, or reducing the fat content. Since carbohydrates, especially starches, are a significant component of basic goods, especially of rice and flour that feed billions people on Earth, it would also be advantageous to produce low calorie, high nutritional starch replacements. Such ingredients could then be employed in noodles, breads, cookies, sweet rolls, doughnuts, crackers, pastries, cakes and cake mixes, snacks, and the like, which are favorites in the diets of those who often struggle to maintain or reduce their present weight.

Meanwhile, this planet produces 390 million metric tons rice annually. The regular rice milling process produces considerable rice by-products, such as rice hull and rice bran. For example, the bran layer makes up about 8 to 10% of the rough rice weight. However, rice hulls and rice bran are considered in most countries as by-product and are disposed of or immediately sold as animal feed. This is a wrong concept about rice milling by-products. Rice hulls, a recycled resource, could be used as a fiber source, premix, and pellet binder in the animal feed industry. Rice bran is a mixture of substances, including protein, fat, ash, and crude fiber. Rice bran is also a very good source of cooking oil.

SUMMARY OF THE PRESENT INVENTION

A main object of the present invention is to provide a method to manufacturing starch-free flour, wherein the starch-free flour is adapted to replace the traditional flour employed in flour-based foods, such as noodles, breads, cookies, sweet rolls, doughnuts, crackers, pastries, cakes and cake mixes, snacks, and the like, so as to produce a starch-free nutritional and healthy food.

Another object of the present invention is to provide a starch-free flour, wherein no expensive raw material is required, instead, nutritional rice milling by-products rice bran is used as raw material.

Another object of the present invention is to provide a starch-free flour, which has high percentage of water absorbable fiber and other nutritional substances for health.

Another object of the present invention is to provide a starch-free flour, wherein the user is able to use the starch-free flour as a substitution to make any flour-based food by using the traditional making process.

Accordingly, in order to accomplish the above objects, the present invention provides a starch-free flour which comprises a predetermined amount of protein powders, a predetermined amount of gluten powders, and a predetermined amount nano bran fine particles mixing with the protein powders and the gluten powder, wherein the nano bran fine particles, carrying positive charges and having water and oil absorbing ability, are made of starch-free rice bran grinded under a predetermined circumstance.

Furthermore, the present invention provides a method to manufacturing starch-free flour, comprising the steps of:

(a) grinding a starch-free rice bran to form a bran powder;

(b) finely grinding the bran powder under a predetermined circumstance to form nano bran fine particles carrying positive charges and having water and oil absorbing ability; and (c) mixing the nano bran fine particles with protein powders and gluten powders to form the starch-free flour.

These and other objectives, features, and advantages of the present invention will become apparent from the following detailed description, the accompanying drawings, and the appended claims.

DETAILED DESCRIPTION OF THE PREFERRED EMBODIMENT

Figure 1:
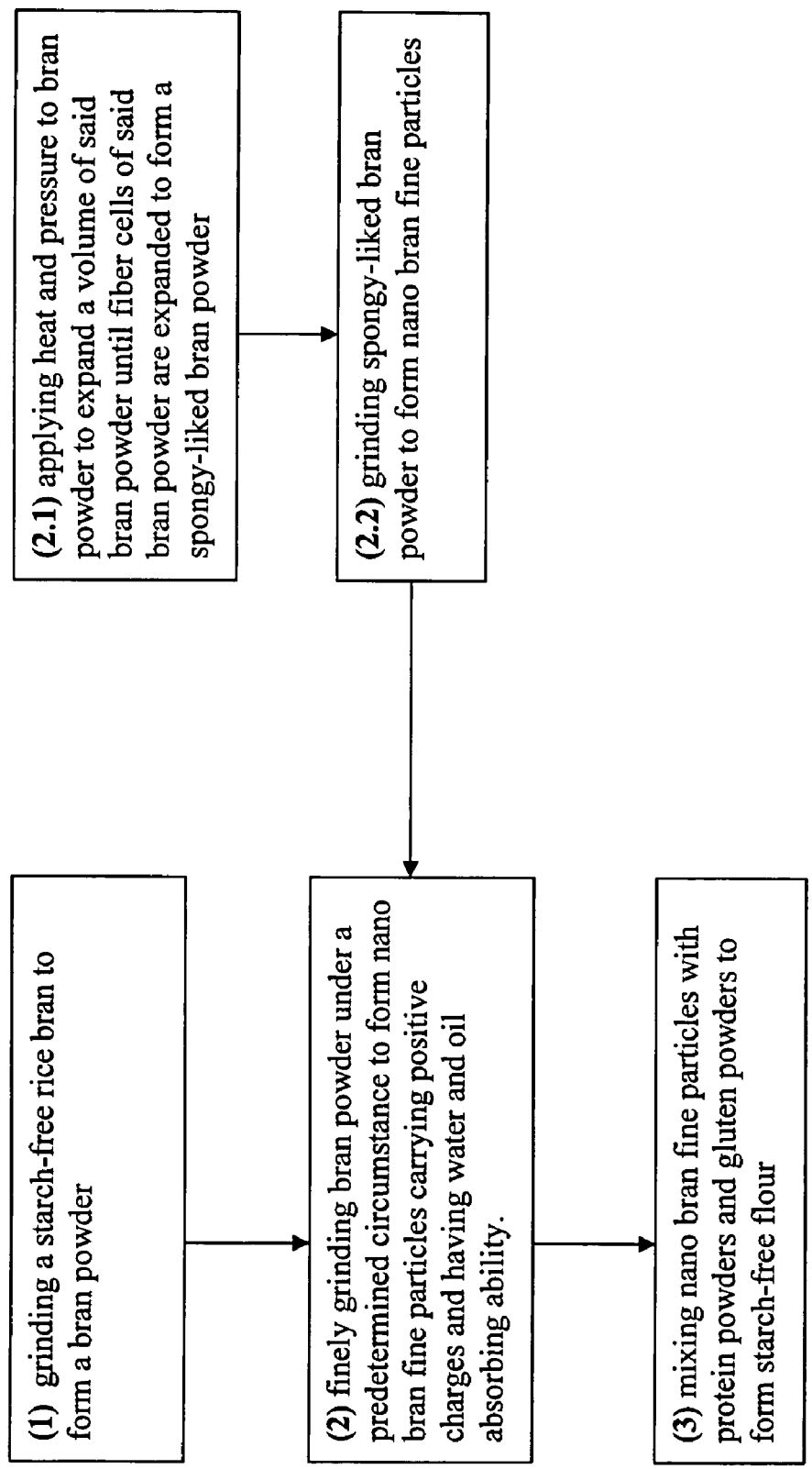
FIG. 1 is flow chart illustrating a method of manufacturing starch-free flour according to a preferred embodiment of the present invention.

Referring to FIG. 1 of the drawings, a flow chart for a method of manufacturing starch-free flour according to the preferred embodiment of present invention is illustrated, wherein the method comprises the following steps.

(1) Grind a starch-free rice bran to form a bran powder.

(2) Finely grind said bran powder under a predetermined circumstance to form nano bran fine particles carrying positive charges and having water and oil absorbing ability.

(3) Mix the nano bran fine particles with protein powders and gluten powders to form the starch-free flour.

According to the preferred embodiment, in step (a), the rice bran is roughly pulverized into pulverized rice bran with a predetermined level, wherein the rice bran is the outer brown layer of the rice kernel that is removed during the milling process, which generates the familiar white rice. According to the preferred embodiment of present invention, rice bran is roughly pulverized into 60-100 units with respect to its original size. In other words, in step (a), the rice bran particle is roughly pulverized into $1/60$ to $1/100$ of its original size.

Commonly, when harvested from the field, rice is in the form of paddy or rough rice, where the kernel is enveloped by a rice hull. After being dried, rice for human consumption is first milled to remove the hull, yielding brown rice with rice bran. In a second stage of milling, the outer brown layer is removed from the rice kernel to yield polished or the familiar white rice. Depending on the milling techniques, rice bran might be mixed with part of the rice hull.

The rice bran is one of the most nutritious parts of the rice kernel. Here, as raw material of present invention starch-free flour, the nutritive value of the rice bran is very important. In fact, the rice bran is a mixture of substances, including protein, fat, ash, and crude fiber. In many cases, rice bran contains certain fractions of rice hull, which further increases the ash and fiber content of rice bran. Besides, the rice bran is also an excellent source of vitamins B and E. Moreover, the rice bran further contains small amounts of anti-oxidants, which are considered to low cholesterol in humans. What is more, the rice bran is an important source of high quality cooking oil.

The composition of rice bran (in percent by weight) is generally 11-13% of water, 18-21% of crude fat and oil, 14-16% crude protein, 8-10% of crude fiber, 9-12% of ash and 33-36% of carbohydrate. Together with the composition of rice hull (in percent by weight) 2.0-2.8% of crude protein, 0.3-0.8% of crude fat, 34.5-45.9% of crude fiber, 13.2-21.0% crude ash, and 22-34% carbohydrate, rice bran, mixed fractions of rice hulls, is undoubted ideal raw material of edible food for human being. However, due to its special composition, especially high percentage of crude fiber and crude ash, rice bran and rice hulls are not soluble in liquefied agent, such as water and oil. This is due to the fact that Cellulose is fiber found heavily contained in rice hull and rice bran. Besides, cellulose is a polysaccharide composed of 1, 4-linked glucose units that are negligibly digestible. Because of this, it would appear that cellulose should be a good low calorie replacement for starch, but attempts to use it as an ingredient in food products have been less than successful for it is intrinsically insoluble in water. This feature is ascribed to the cooperative cohesion of its chain segments in its crystalline domains. The property of water insolubility also creates difficulties in forming dispersions in some food formulations.

It is well known in the process making flour products, such as noodles, cookies, doughnuts and breads, water is added to flours first to create dough first, which are workable or machinable, can be extruded or sheeted based upon user's desire. In the case of dough that contains starch, the extruded or sheeted product is then dried, baked, fried, etc. into a final product. Unfortunately, there is no starch contained in rice bran, so the rice bran dough handling is impossible. However, noodles and bread need dough having strong deformability and easier handling to form desirable appearances. In other words, water and oil insolubility hinders rice bran from forming 'flour' dough to be made into ending 'flour' products. According to the preferred embodiment, the present invention is disclosed to solve this matter.

According to the preferred embodiment, the step (2) further comprises the following sub-steps.

(2.1) Pressurize the bran powder to expand a volume of the bran powder until fiber cells of the bran powder are expanded to form a spongy-liked bran powder.

(2.2) Grind the spongy-liked bran powder to form the nano bran fine particles.

The step (2.1) further comprises a step of applying heat on the bran powder to expand the volume of thereof.

Since rice bran is poorly soluble in water and oil, in step (b), the bran powder is pressurized in a puffing chamber to volumetrically expand the bran powder. According to preferred embodiment, under high pressure and temperature circumstance, the bran powder will be spongy formed to an extent that fibrous cell is fully exposed in the puffing chamber thus enormously expand the volume of the bran powder. Afterwards, nano-technology is employed to decrease the particle size of puffed bran powder to nanometer size range, thereby leading to an increase in the volume and a subsequent increase in dissolution rate. In the preferred embodiment, each of the nano bran fine particles has a size between 50 to 100 nanometers. Here, in step (2.2), the spongy-liked bran powder is further pulverized into 500 to 2000 units with respect to rice bran's original size. In other words, the rice bran particle is ultimately pulverized into 1/500 to 1/2000 of its original size in step (2.2) to form nano-scale fine particles.

Here, the emerging fields of nanoscale science, engineering, and technology, the ability to work at the molecular level, atom by atom, to create large structures with fundamentally new properties and functions are leading to unprecedented understanding and control over the basic building blocks and properties of rice bran. In other words, by pulverizing rice bran into nano-porous ultra-fine fibrous materials, the basic building blocks and properties of rice bran could be altered to be more water and oil absorptive. Furthermore, nanoscale rice bran particles are positive charged which is crucial to water and oil solubility. In other words, nano bran fine particles will have water-loving ends having a positive charge, which could be inserted into water molecule for further reaction.

This is due to the fact that a water molecule is angular with charged ends: the oxygen atom bears a slightly negative charge while the hydrogen atoms bear a slightly positive charge. When an ion is inserted into a water configuration, it changes the structure of the hydrogen bond network. A water molecule tends to rotate (reorient) so that its polarized charge concentration faces the opposite charge of the ion. As the water molecules orient themselves towards the ion, they break the hydrogen bonds to their nearest neighbors. As a result, the positive charged nano bran fine particles are very crucial to water solubility. This explanation is based on the concept that separated, charged particles, called ions, exist in water solution. These ions, which are mobile in water solution, could carry an electrical current. Ions in liquids are known to separate, or polarize, according to their charge (positive or negative) when interacting with non-conducting solids. After positive charged nano bran fine particle is interfered with polarized water, rice bran ions will automatically react with corresponding opposed ions. This is to say that water molecules will cluster around the rice bran ions so that the anions will attract the hydrogen ions in the water and the cations will attract the oxygen ions in the water, thereby increasing rice bran's water absorbing capacity.

Accordingly, the protein powders are extracted from egg white or from beans, wherein the protein powders not only enhance the nutritional value of the starch-free flour but also enhance the adhesive ability of the starch-free flour when the starch-free flour mixes with water. The gluten powders are extracted from corn or wheat. According to the preferred embodiment, the starch-free flour contains 50 to 90% of the nano bran fine particles by weight. Preferably, a ratio of the nano bran fine particles, the protein powders and the gluten powders is 8:1:1 by weight.

It is worth to mention 1% or more of vegetable extract are mixed with the nano bran fine particles, the protein powders and the gluten powder vegetables essential elements to increase nutritional value of the starch-free flour.

Conclusively, the present utilized abundantly available rice by-production to produce starch-free composition replacing traditional flour employed in foods, like noodles, breads, cookies, sweet rolls, doughnuts, crackers, pastries, cakes and cake mixes, snacks, and the like, wherein the new composition is nutritional and healthy. In short, the present invention converts wasted rice by-production into nutritional foods, in which high percentage fiber and protein substance is contained. It is worth to mention that the user is able to use the starch-free flour as a substitution to make any flour-based food by using the traditional making process.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of manufacturing starch-free flour, comprising the steps of:
   (a) grinding a starch-free rice bran to form a bran powder;
   (b) finely grinding said bran powder under a predetermined circumstance to form nano bran fine particles carrying positive charges and having water and oil absorbing ability wherein each of said nano bran fine particles has a size between 50 to 100 nanometers; and
   (c) mixing said nano bran fine particles with protein powders and gluten powders to form said starch-free flour.

2. The A method of manufacturing starch-free flour, comprising the steps of:
   (a) grinding a starch-free rice bran to form a bran powder;
   (b) finely grinding said bran powder under a predetermined circumstance to form nano bran fine particles carrying positive charges and having water and oil absorbing ability wherein each of said nano bran fine particles has a size between 50 to 100 nanometers; and
   (c) mixing said nano bran fine particles with protein Powders and gluten powders to form said starch-free flour, wherein said step (b) further comprises the sub-steps of:
   (b.1) pressurizing said bran powder to expand a volume of said bran powder until fiber cells of said bran powder are expanded to form a spongy-liked bran powder and applying heat on said bran powder to expand said volume of thereof; and
   (b.2) grinding said spongy-liked bran powder to form said nano bran fine particles.

3. The method, as recited in claim 2, wherein said starch-free flour contains 50 to 90% of said nano bran fine particles by weight.

4. The method, as recited in claim 3, further comprising a step of mixing a predetermined amount of vegetable extract mixing with said nano bran fine particles, said protein powders and said gluten powder.

5. The method, as recited in claim 2, further comprising a step of mixing a predetermined amount of vegetable extract mixing with said nano bran fine particles, said protein powders and said gluten powder.

6. A starch-free flour, comprising:

a predetermined amount of protein powders:

a predetermined amount of gluten powders:

a predetermined amount nano bran fine particles mixing with said protein powders and said gluten powder, wherein said nano bran fine particles, carrying positive charges and having water and oil absorbing ability, are made of starch-free rice bran grinded under a predetermined circumstance, wherein each of said nano bran fine particles has a size between 50 to 100 nanometers.

7. The starch-free flour, as recited in claim 6, wherein said rice bran is pressurized to expand a volume thereof until fiber cells of said rice bran are expanded to form a spongy-liked bran powder such that said spongy-liked bran powders are grinded to form said nano bran fine particles.

8. The starch-free flour, as recited in claim 7, containing 50 to 90% of said nano bran fine particles by weight.

9. The starch-free flour, as recited in claim 8, further comprising a predetermined amount of vegetable extract mixing with said nano bran fine particles, said protein powders and said gluten powder.

10. The starch-free flour, as recited in claim 6, containing 50 to 90% of said nano bran fine particles by weight.

* * * * *